United States Patent [19]

Auld et al.

[11] Patent Number: 5,165,517
[45] Date of Patent: Nov. 24, 1992

[54] COMBINER FOR STREAMS OF ARTICLES, SUCH AS BOTTLES

[75] Inventors: John W. Auld; Brian F. Stringer, both of St. Albans, United Kingdom

[73] Assignee: Noshe Engineering Limited, United Kingdom

[21] Appl. No.: 769,126

[22] Filed: Sep. 30, 1991

[51] Int. Cl.[5] .............................................. B65G 47/68
[52] U.S. Cl. .................................... 198/450; 198/451
[58] Field of Search ........................ 198/449, 450, 451

[56] References Cited

U.S. PATENT DOCUMENTS

| | | | |
|---|---|---|---|
| 2,108,522 | 2/1938 | Bergmann | 198/450 |
| 2,770,348 | 11/1956 | Day et al. | 198/450 X |
| 2,801,651 | 8/1957 | Street | 198/450 X |
| 3,178,006 | 4/1965 | Nigerelli et al. | 198/450 X |
| 3,197,014 | 7/1965 | Meyer | 198/450 |
| 4,274,533 | 6/1981 | Abe | 198/450 |

Primary Examiner—D. Glenn Dayoan
Attorney, Agent, or Firm—Davis, Bujold & Streck

[57] ABSTRACT

A combiner for a plurality of streams of articles, such as bottles, to be combined into a single stream (4) comprises a starwheel (16, 17) for each stream (1, 2), each starwheel having control fingers (20) spaced around its periphery, the starwheels being oppositely rotated at the same speed in a direction of movement with their control fingers (20) set out-of-phase so that articles are spaced alternately from the streams to enable them to merge. The drive for at least one of the starwheels (16) comprises meshing gears (32, 34) and an adjustment device comprising a plate (33) which has a drive pinion (32) mounted thereon, the plate being pivotal about the axis of the adjacent meshing gear (34) so that the meshing position can be adjusted, thereby causing consequential adjustment of the starwheel to fine tune the out-of-phase setting of its control fingers (20). The starwheels (16, 17) are each mounted on a radial arm (21) which is adjustably supported on an upright (13) to vary the height and spacing of the starwheels for a range of sizes of article. Movement of the plate (33) and the starwheels is accommodated by a telescopic drive shaft (25) and compensating joints (26, 27).

8 Claims, 3 Drawing Sheets

COMBINER FOR STREAMS OF ARTICLES, SUCH AS BOTTLES

This invention relates to combiners for combining a plurality of streams of articles into a single stream.

Combiners are mostly used in association with a conveyor system to combine two streams of articles fed thereto into a single stream.

BACKGROUND OF THE INVENTION

The invention has particular, but not exclusive, application in the glassware industry where, for example, bottles are fed upright in a stream on a conveyor from a manufacturing machine. After manufacture, it is necessary for the bottles to be checked for flaws and this is normally effected by television scanner equipment, such as that sold under the Registered Trade Mark INEX. The scanner equipment is capable of dealing with bottles at a speed of up to 500/min, whereas modern manufacturing machines produce bottles at around only half that figure. Hence, to make more efficient use of the scanning equipment, it is desirable to produce more than one stream of bottles and feed them via the combiner, where they are guided by a controlled phasing to merge into a single stream before passing the scanning equipment.

A combiner is known in which each stream is controlled by a so-called "starwheel" and guide rails. Thus, for example, where the bottles are being fed in two streams to the combiner, a starwheel is provided for each stream and the two starwheels are provided on each side of a central guide rail. The starwheels each have a set of control elements, usually in the form of fingers, spaced around its periphery, the two starwheels being oppositely driven at the same speed to cause the control elements to act in the movement direction of the streams, said control elements being preset out-of-phase with each other and arranged for alternately controlling the spacing of the bottles from the two streams into the single stream.

Difficulties can arise because the speed at which the two streams of bottles enter the combiner can be different, even though the speed of the respective conveyors is the same. Thus, for example, a slightly different output and/or spacing of the bottles leaving their respective manufacturing machines may occur. Should this happen, then because the control elements of the two starwheels are preset in their out-of-phase positions, the bottles from the two streams can clash as they are being combined and perhaps cause breakages or other damage.

SUMMARY OF THE INVENTION

An object of the invention is to provide a combiner in which the out-of-phase relationship between the control elements can be readily adjusted, even in use.

A further object of the invention is to enable the starwheels to be adjusted according to the width and height of articles fed thereto so that a range of articles of different dimensions can be catered for.

According to the invention, a combiner for combining a plurality of streams of articles fed thereto into a single stream and comprising a starwheel and associated guide for each stream, and control elements spaced around the periphery of each starwheel, said starwheels being oppositely driven at substantially the same speed to cause the control elements to act in the movement direction of the streams, and said control elements being preset out-of-phase with each other and arranged for cylically controlling the spacing of the articles from the streams for merging into said single stream, wherein the improvement comprises each starwheel being mounted to rotate about a substantially vertical axis, and means for connecting at least one starwheel to its drive source, said means including a pair of meshing gearwheels, and an adjustment device for effecting a relative rotational movement of the gearwheels to alter their meshing position, thereby causing a consequential adjustment of the starwheel and hence out-of-phase position of its associated control elements.

Preferably, the adjustment device includes a plate on which one of the meshing gearwheels comprising the drive pinion is mounted, the plate being pivotal around the axis of the other gearwheel to effect said relative rotational movement.

According to a feature of the invention, at least one starwheel is journalled to one end of a radial arm, the other end of which is supported to enable the starwheel to be adjusted via the arm according to the width and height of articles fed thereto.

Conveniently, the drive pinion and starwheel are connected via a telescopic drive shaft and compensating joints to cater for pivotal movement of the drive pinion plate and/or adjustment of a said starwheel.

BRIEF DESCRIPTION OF THE DRAWINGS

In order that the invention may be readily understood, and further features made apparent, one embodiment of combiner in accordance therewith will now be described, by way of example, with reference to the accompanying drawings in which.

DESCRIPTION OF THE PREFERRED EMBODIMENT(S)

Figure 1:
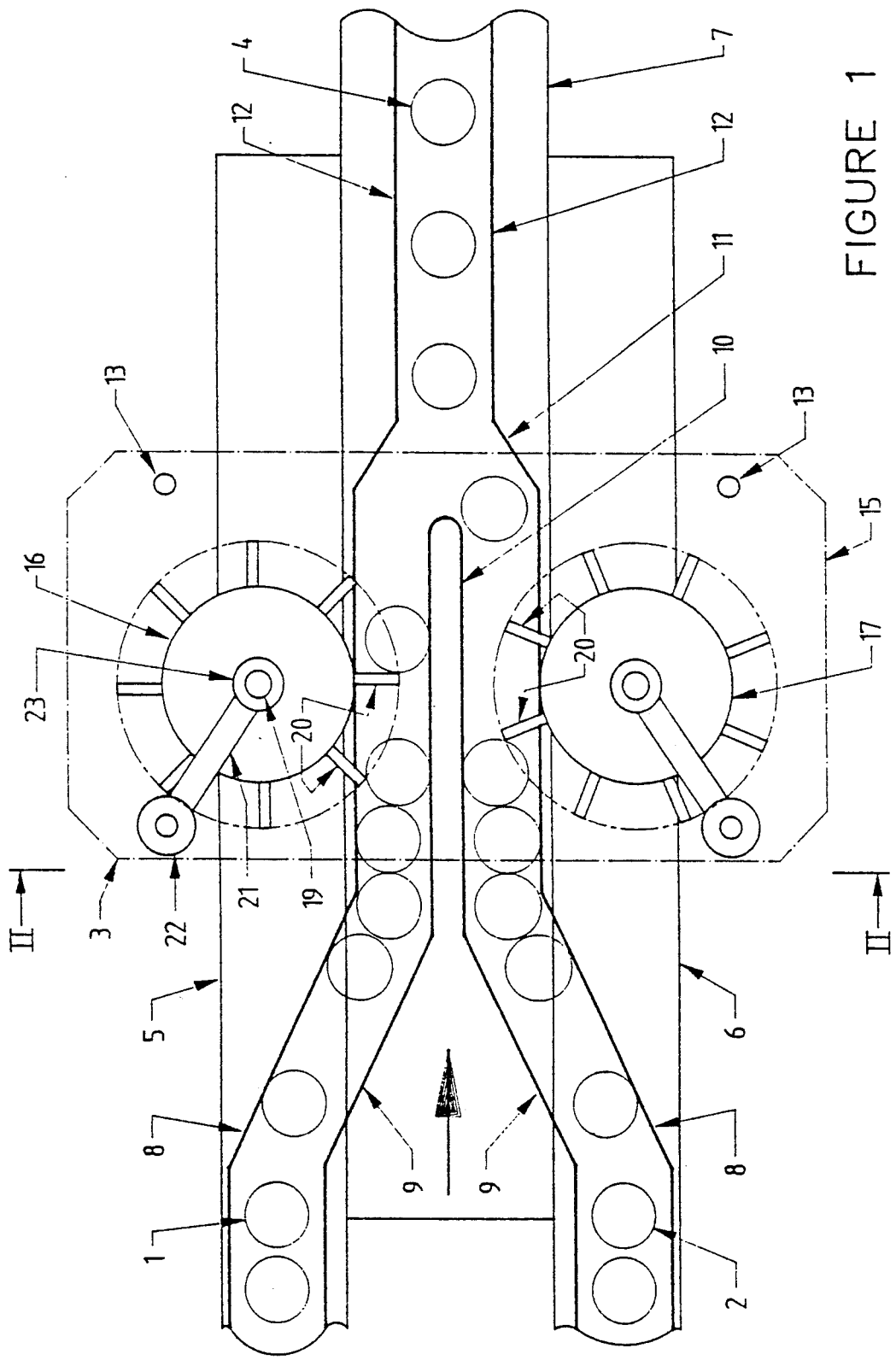
FIG. 1 is a schematic plan view showing the position of the combiner in a conveyor system.

Referring to FIG. 1, the conveyor system is intended to feed two streams 1, 2 of bottles from a bottle manufacturing plant (not shown) in the direction of the arrow into the combiner 3, where the streams are appropriately spaced and merged into a single stream 4. To facilitate this, a pair of spaced, endless conveyor belts 5,6 for the streams 1,2 extend to a position just beyond the combiner 3 and an endless transfer conveyor 7 positioned within the space between the conveyor belts 5,6 extends from a point just upstream of the combiner. Outer and inner guides 8, 9, which can be in the form of rails, or walls, are suspended above the conveyor belts as shown so that the two streams 1, 2 converge and pass into the combiner alongside each other, but on opposite sides of a central guide rail 10. Downstream of the central guide rail 10, the outer guides 8 converge to form a throat 11 which causes the merged streams of bottles to be guided into a single file for passing between further parallel, outer guides 12.

Figure 2:
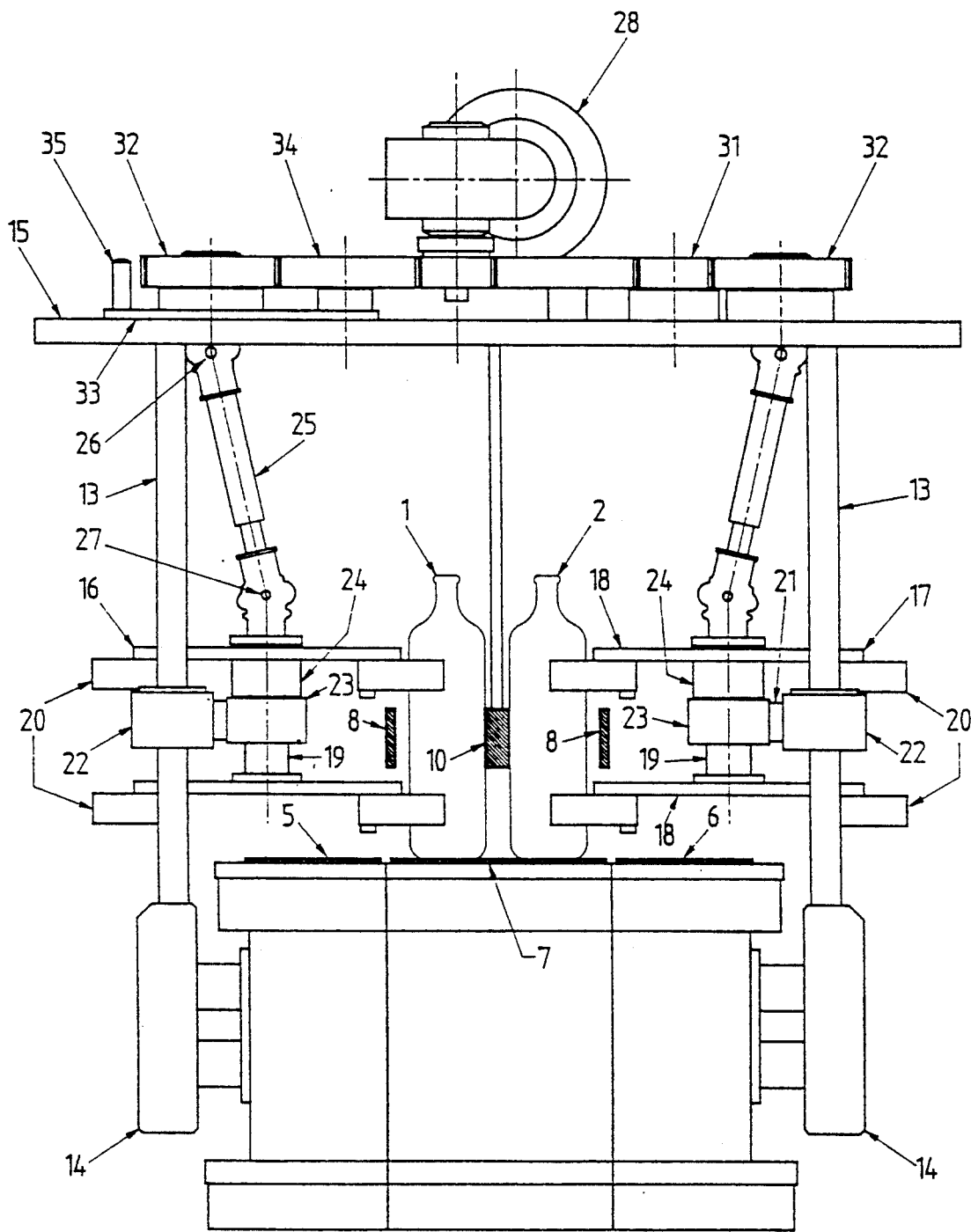
FIG. 2 is an elevation of the combiner and conveyor system along the line II—II in FIG. 1 and, FIG. 3 is a plan view of the combiner.

Referring now to FIG. 2, the combiner has a support structure comprising four uprights 13, which are rigidly fixed in a rectangular, spaced array by lower fixings 14 and a top plate 15. Two starwheels 16, 17 are provided for controlling the spacing of the two streams 1, 2 of bottles to enable the streams to merge, each being mounted to rotate about a vertical axis and comprising a pair of vertically spaced plates 18 which are connected via a hub 19, the plates having a set of control elements in the form of pairs of fingers 20 appropriately spaced around and projecting from the periphery of said plates. It will be appreciated that the spaced vertical plates are effective to stablizie tall bottles. Each starwheel is supported in position by a radial arm 21, (see also FIG. 1) having a first bush 22 at its outer end which is rotatably and slidably mounted on an adjacent upright 13 and a second bush 23 at its inner end which acts as a journal bearing for the starwheel hub 19. Each radial arm 21 can thus be swung to vary the spacing of its respective starwheel from the central guide rail 10 and also its height to suit the dimensions of the bottles being fed to the combiner. In this embodiment the spacing of the plates 18 on the hub 19 of each starwheel is adjustable to suit the height of bottles fed thereto, said spacing being by a spacer bush 24 of appropriate dimension. As will be noted from FIG. 1, the starwheels are mounted with their respective control fingers 20 preset out-of-phase, so that when driven at susbtantially the same speed in the movement direction of the conveyor, they alternately space the bottles of the two streams 1, 2 to enable them to merge into a single stream.

In this embodiment, the drive to each starwheel comprises a telescopic, splined, drive shaft 25 having a compensating universal joint 26, 27 (preferably protected by a gaiter as shown) at each end, by which it is connected between the hub 19 and the drive source.

Figure 3:
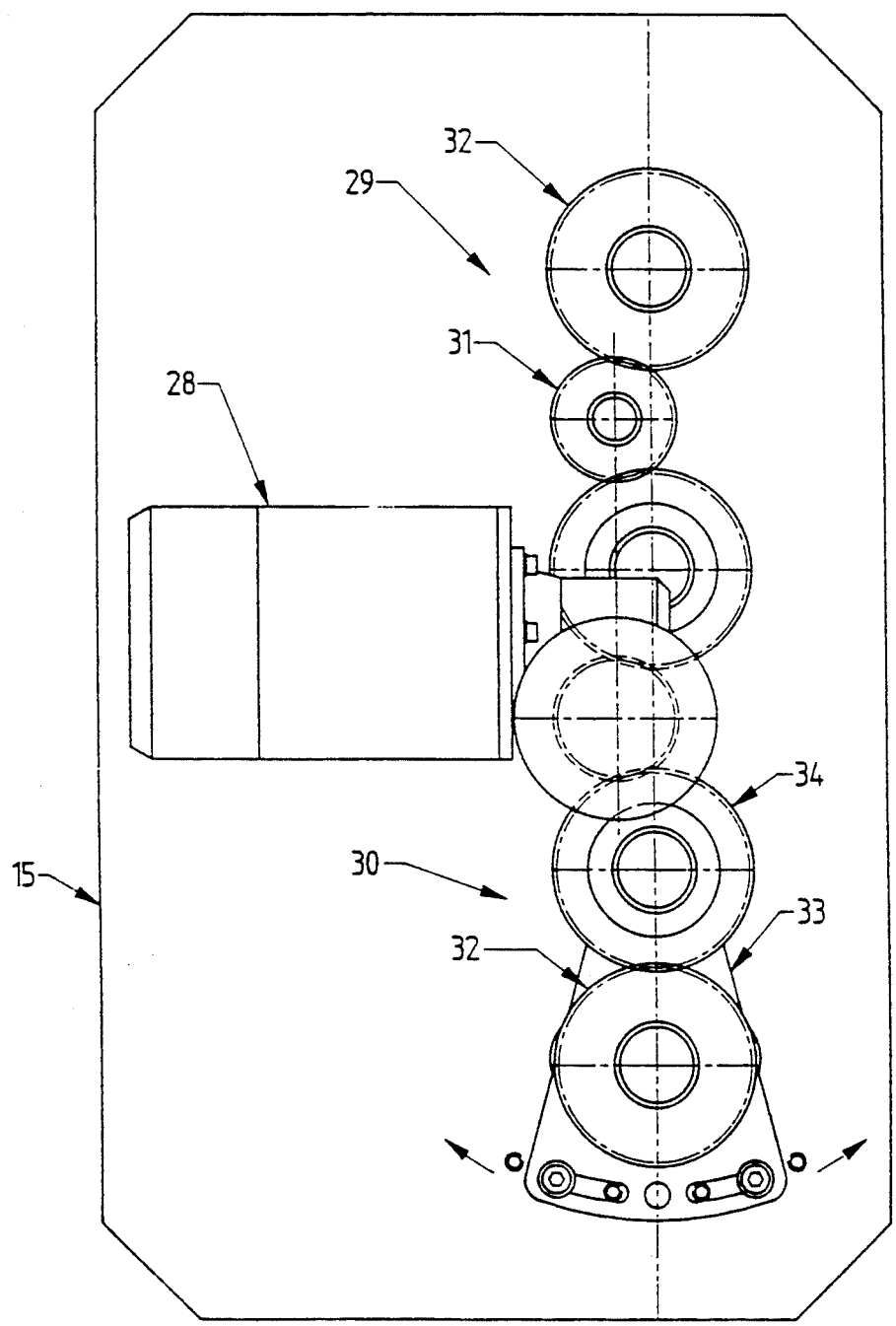

Referring to FIG. 3, the drive source comprises a motor 28 which drives two gear trains 29, 30, one for each starwheel, the trains being the same, except for an idler wheel 31 included in one train 29 so that the drive pinions 32 for the starwheels rotate the latter at the same speed but in opposite rotational directions, in the movement direction of the conveyor belts. However, in accordance with the invention, for at least one drive train 30, as shown in FIG. 3, the drive pinion 32 is mounted on a quadrant plate 33 which can be rotated in either direction as shown by the arrows, via an operating pin 35, to cause the gear teeth of the drive pinion 32 to rotate around its meshing gear wheel 34 and hence change the meshing position. This causes a consequential adjustment of the starwheel 16 and hence the out-of-phase position of its control fingers 20 relative to the other starwheel 17. It will be appreciated that adjustment can be effected even during operation of the combiner.

The invention thus provides a combiner in which the out-of-phase setting of the control fingers of the starwheels 16, 17 can be fine tuned during use and in which the positions of the starwheels can be readily adjusted to suit a range of articles of different sizes.

We claim:

1. A combiner for combining a plurality of streams of articles fed thereto into a single stream and comprising a starwheel and associated guide for each stream, and control elements spaced around the periphery of each starwheel, said starwheels being oppositely driven at substantially the same speed to cause the control elements to act in the movement direction of the streams, said control elements being preset out-of-phase with each other and arranged for cyclically controlling the spacing of the articles from the streams for merging into said single stream,
   wherein the improvement comprises each starwheel being mounted to rotate about a substantially vertical axis, and means for connecting at least one starwheel to its drive source, said means including a pair of meshing gearwheels, and an adjustment device for effecting a relative rotational movement of the gearwheels to alter their meshing position, thereby causing a consequential adjustment of the starwheel and hence out-of-phase position of its associated control elements,
   the adjustment device includes a plate upon which one of the meshing gearwheels is mounted, and the plate is pivotable about an axis of the other gearwheel to effect the relative rotational movement.

2. A combiner according to claim 1, wherein a drive pinion is the meshing gearwheel mounted on the plate, and the drive pinion and starwheel are connected via a telescopic drive shaft and compensating joints to cater for pivotal movement of the drive pinion plate.

3. A combiner according to claim 1, wherein at least one starwheel is journalled to one end of a radial arm, the other end of which is supported to enable the starwheel to be adjusted according to the width and height of articles fed thereto.

4. A combiner according to claim 3, wherein one of said pair of meshing gearwheels is a drive pinion and the drive pinion and starwheel are connected via a telescopic drive shaft and compensating joints to cater for adjustment of a said starwheel.

5. A combiner according to claim 3, wherein said other end of the radial arm is provided with a first bush which is pivotally and slidably mounted on an upright support.

6. A combiner according to claim 5, wherein said one end of the radial arm has a second bush comprising the journal for its respective starwheel.

7. A combiner according to claim 1, wherein each starwheel comprises a pair of vertically spaced plates connected via a hub, and each plate has control elements in the form of pairs of fingers.

8. A combiner according to claim 7, wherein the spacing of said plates is adjustable via a spacer bush of appropriate dimension.

* * * * *